(12) United States Patent
Chen (10) Patent No.: US 8,561,094 B2
(45) Date of Patent: *Oct. 15, 2013

(54) PROTECTING IDENTIFICATION INFORMATION IN USAGE REPORTS

(75) Inventor: Michael A Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 109 days.

This patent is subject to a terminal disclaimer.

(21) Appl. No.: 13/097,738

(22) Filed: Apr. 29, 2011

(65) Prior Publication Data

US 2011/0209169 A1    Aug. 25, 2011

Related U.S. Application Data

(63) Continuation of application No. 12/641,923, filed on Dec. 18, 2009, now Pat. No. 7,958,523, which is a continuation of application No. 11/041,655, filed on Jan. 24, 2005, now Pat. No. 7,653,920.

(51) Int. Cl.
*H04H 60/33* (2008.01)
*H04H 60/32* (2008.01)
*H04L 9/00* (2006.01)
*H04N 7/167* (2011.01)

(52) U.S. Cl.
USPC .................. 725/9; 725/14; 725/31; 380/264

(58) Field of Classification Search
None
See application file for complete search history.

(56) References Cited

U.S. PATENT DOCUMENTS

| | | | |
|---|---|---|---|
| 5,872,588 A | 2/1999 | Aras et al. | |
| 6,286,005 B1 | 9/2001 | Cannon | |
| 6,353,929 B1 | 3/2002 | Houston | |
| 6,564,056 B1 | 5/2003 | Fitzgerald | |
| 6,965,674 B2 | 11/2005 | Whelan et al. | |
| 6,983,379 B1 | 1/2006 | Spalink et al. | |
| 7,197,472 B2 | 3/2007 | Conkwright et al. | |
| 7,343,375 B1 | 3/2008 | Dulac | |
| 7,444,655 B2 | 10/2008 | Sardera | |
| 7,472,423 B2 * | 12/2008 | DeCenzo et al. | ............... 726/26 |
| 7,587,728 B2 | 9/2009 | Wheeler et al. | |
| 2003/0037333 A1 | 2/2003 | Ghashghai et al. | |
| 2003/0105694 A1 | 6/2003 | Conkwright et al. | |

(Continued)

FOREIGN PATENT DOCUMENTS

WO    WO 2005079501    9/2005

*Primary Examiner* — Chris Parry
(74) *Attorney, Agent, or Firm* — Banner & Witcoff, Ltd.

(57) ABSTRACT

A television program ratings method and system includes transferring information associated with households from a cable provider to a ratings provider such that the ratings provider has access to information associated with sampled households and lacks access to information associated with non-sampled households. To this end, identity information and usage information associated with the households are respectively anonymized and encrypted. Knowledge of the identities of the sampled households enables the anonymized identity information and the encrypted usage information for the sampled households to be respectively de-anonymized and decrypted. The ratings provider knows which households are sampled households. As such, the ratings provider de-anonymizes and decrypts the information associated with the sampled households and then uses the de-anonymized and decrypted information to determine television program ratings. The cable provider anonymizes and encrypts the information for all households as the cable provider does not know which households are sampled households.

47 Claims, 2 Drawing Sheets

(56) References Cited

U.S. PATENT DOCUMENTS

| | | |
|---|---|---|
| 2003/0110485 A1 | 6/2003 | Lu et al. |
| 2003/0145319 A1 | 7/2003 | Sato |
| 2003/0219129 A1 | 11/2003 | Whelan et al. |
| 2004/0088729 A1 | 5/2004 | Petrovic et al. |
| 2006/0080464 A1 | 4/2006 | Kozuki |
| 2007/0157262 A1 | 7/2007 | Ramaswamy et al. |
| 2007/0186228 A1 | 8/2007 | Ramaswamy et al. |
| 2007/0186229 A1 | 8/2007 | Conklin et al. |

\* cited by examiner

| 62~MAC' | 30~DATE | 32~PID | 34~AID | 36~PLAY | 38~FF | 40~REW |
|---|---|---|---|---|---|---|
| FOX | 6/4 | (NEED KEY VALUE 4 TO DECRYPT) ||||| 
| THE | 6/5 | (NEED KEY VALUE 1 TO DECRYPT) ||||| 
| FOX | 6/5 | (NEED KEY VALUE 4 TO DECRYPT) ||||| 
| JUMPED | 6/6 | (NEED KEY VALUE 5 TO DECRYPT) |||||

*Fig. 3*

| MAC' | DATE | PID | AID | PLAY | FF | REW |
|---|---|---|---|---|---|---|
| FOX | 6/4 | A | F | 12 | 0 | 0 |
| THE | 6/5 | (NEED KEY VALUE 1 TO DECRYPT) ||||| 
| FOX | 6/5 | (INELIGIBLE DATE - MUST NOT DECRYPT) ||||| 
| JUMPED | 6/6 | (NEED KEY VALUE 5 TO DECRYPT) |||||

*Fig. 4*

| 82~MAC' | DATE | PID | AID | PLAY | FF | REW |
|---|---|---|---|---|---|---|
| 11 | 6/4 | (NEED 10 * 88 + 4 + 7 = 891 TO DECRYPT) ||||| 
| 8 | 6/5 | (NEED 10 * 55 + 1 + 7 = 558 TO DECRYPT) ||||| 
| 11 | 6/5 | (NEED 10 * 88 + 4 + 7 = 891 TO DECRYPT) ||||| 
| 12 | 6/6 | (NEED 10 * 99 + 5 + 7 = 1002 TO DECRYPT) |||||

*Fig. 5*

| MAC | MAC' | DATE | PID | AID | PLAY | FF | REW |
|---|---|---|---|---|---|---|---|
| 4 | 11 | 6/4 | A | F | 12 | 0 | 0 |
| ? | 8 | 6/5 | (NEED 10 * 55 + 1 + 7 = 558 TO DECRYPT) |||||| 
| 4 | 11 | 6/5 | (INELIGIBLE - MUST NOT DECRYPT) |||||| 
| ? | 12 | 6/6 | (NEED 10 * 99 + 5 + 7 = 1002 TO DECRYPT) ||||||

*Fig. 6*

PROTECTING IDENTIFICATION INFORMATION IN USAGE REPORTS

This application is a continuation of U.S. application Ser. No. 12/641,923, filed Dec. 18, 2009, which is a continuation of U.S. application Ser. No. 11/041,655, filed Jan. 24, 2005, now U.S. Pat. No. 7,653,920, the specifications for which are hereby incorporated by reference as non-limiting example embodiments.

TECHNICAL FIELD

The present application generally relates to the field of television program ratings and, more particularly, to a method and system for transferring cable television subscriber information to a television program ratings provider such that the ratings provider has access to the information of sampled cable television subscribers while being prevented from accessing the information of the remaining cable television subscribers.

BACKGROUND

A television program rating is a measure of the number of viewers watching a television program. Television program ratings are important for determining advertising revenue which can be charged for programs. Demographic analysis of rating information is important because programs intended for children desirably include advertisements for items of interest to children such as toys, while programs intended for adults desirably include advertisements for items of interest to adults such as automobiles and household products.

A cable television subscriber household generally includes one or more televisions with each television being associated with a cable network device such as a set-top-box (STB). STBs connect associated televisions to the network infrastructure of a cable television service provider. A STB provides programs received from the cable provider to the associated television for household members to view. A household member selects a channel using the STB and then the television receives programs associated with the selected channel from the cable provider via the STB.

Household members also provide Video-on-Demand (VOD) commands to the STB for receipt by the cable provider. VOD generally refers to a head-end based transmission of content from the cable provider to the households upon requests from the household members. A household member provides a VOD command to the STB in order to request that the cable provider deliver a program to the STB for viewing on the television. In this case, the STB transfers the VOD command to the cable provider which in turn provides the desired program to the STB for display on the television. VOD has transport controls like a video cassette recorder (VCR). VCR-type VOD commands enable household members to view programs on their own schedules. Such VOD commands include play, pause, fast forward, rewind, playback, etc. The cable provider controls programs displayed on the television accordingly in response to these VOD commands.

A method of collecting viewing data from a cable television subscriber household to determine program ratings includes connecting a monitor to each STB in the household. The monitor detects the channel to which the associated television is tuned and when each tune takes place. The monitor may also be configured to prompt a household member to identify him or herself as part of a program audience. The monitor provides the viewing data to a central office for use by a television program ratings provider. The ratings provider compares the viewing data with reference data which includes a list of programs available on each channel during given times. By comparing the tuned channels, i.e., the channels to which the television is tuned, to the programs available on those channels at the time, the ratings provider can determine the programs viewed by household members.

This viewing data collection method is performed on a sampled cross-section of households in a viewing area. The ratings provider uses the viewing data from the sampled households to determine program ratings. The sampled households are a subset of all households in the viewing area. The sampled households are chosen using methodological standards such that the subset represents the viewing behavior of all households in the viewing area. Typically, the sampled households have agreed to allow collection and use of their private viewing information.

Cable providers have expanded their pay-per-view (PPV) services into other areas of On-Demand and are using new digital compression technologies for distribution. As a result, a problem with the described viewing data collection method is that simply knowing channel positions and channel change times does not provide sufficient information regarding actual demand events that have been viewed.

A solution is to collect VOD usage data from the sampled households for the ratings provider to use in order to determine program ratings. VOD usage data of a household is indicative of programs and other VOD events that have been viewed by household members. The cable provider logs such VOD usage data as the cable provider streams programs to the STBs in the households. Thus, the ratings provider could obtain the VOD usage data for the sampled households from the cable provider to determine program ratings.

However, policies and regulations mandate that personally identifiable information be protected from scrutiny by unauthorized third parties. Anonymous information may be tracked and analyzed, but anonymous information provides reduced value because anonymity obscures links to demographic information. Sampling methods where certain subpopulations opt in and allow their usage to be tracked (i.e., the sampled households in a viewing area) provide the required demographic information, but to maintain statistical sample properties the identities of the subset within the larger population (i.e., all households in the viewing area) must remain anonymous. This complicates data collection from within larger data samples where household-specific identifying information is made anonymous.

Thus, a problem with the above-described solution of having the ratings provider obtain the VOD usage data for the sampled households from the cable provider is that the ratings provider has to keep private the sampled household identities. As such, the cable provider does not know the identities of the sampled households. Thus, to overcome this problem, the cable provider has to provide the ratings provider with the VOD usage data for all households in order for the ratings provider to have the VOD usage data for the sampled households.

However, a problem with this solution is that the ratings provider is not authorized to know the non-sampled household identities. Further, the cable provider does not want to provide the ratings provider with the VOD usage data of the non-sampled households as the ratings provider is not entitled to this information. Thus, the ratings provider is authorized to access the information (identity and VOD usage date) associated with the sampled households but is not authorized to access such information associated with the non-sampled households.

In sum, the ratings provider knows the sampled household identities. The cable provider has the information associated with all households in the viewing area. The ratings provider is authorized to obtain the information associated with the sampled households from the cable provider, but cannot tell the cable provider the sampled household identities. As a result, the cable provider has to provide the ratings provider with the information associated with all households in the viewing area in a manner which allows the ratings provider to access the information associated with the sampled households and which prevents the ratings provider from accessing the information associated with the non-sampled households.

SUMMARY

Accordingly, it is an object of the present invention to provide a method and system for transferring information associated with cable television subscribers from a cable television service provider to a television program ratings provider such that the ratings provider has access to the information associated with sampled subscribers and lacks access to the information associated with the remaining non-sampled subscribers.

It is another object of the present invention to provide a method which allows efficient selection of a known subset (i.e., sampled households in a viewing area) from within a larger population (i.e., all households in the viewing area) while maintaining data security for others (i.e., the remaining non-sampled households in the viewing area).

It is a further object of the present invention to provide a method for the dissemination of reporting information including a sampling of subscribers (i.e., sampled households in a viewing area) within a larger population (i.e., all households in the viewing area) to third parties (i.e., ratings provider) while preserving data security for subscribers (i.e., non-sampled households) that have not opted into the analysis processes of these third parties.

It is still another object of the present invention to provide a method for transferring identity and VOD information associated with households in a viewing area from a cable provider to a ratings provider in which the method includes anonymizing the identity information and encrypting the VOD information prior to transfer to the ratings provider in a manner which allows the ratings provider to de-anonymize and decrypt the information associated with sampled households and which prevents the ratings provider from de-anonymizing and decrypting the information associated with the non-sampled households.

In carrying out the above objects and other objects, the present invention provides a method and an associated system for transferring information associated with households from a cable provider to a ratings provider. The method includes associating a subset of households with a ratings provider such that for each household in the subset the ratings provider knows identification information indicative of the household. The households in the subset are sampled households and the remaining households in the subset are non-sampled households. The method further includes logging information associated with programs streamed from a cable provider to the sampled and non-sampled households. The logged information for each program streamed to a household includes identification information indicative of the household receiving the program and usage information indicative of the use by the household of the program.

A report of the logged information is then generated such that for each program streamed to a household the report includes a record of the logged information for the program streamed to the household. The identification information and the usage information contained in each record in the report are then respectively anonymized and encrypted to anonymize and encrypt the report such that each record in the anonymized and encrypted report is able to be de-anonymized and decrypted by a receiving party if the receiving party knows the identification information contained in the record. The de-anonymization and decryption may require the receiving party to correlate the identification information contained in a record with other information not present in the record. The anonymized and encrypted report is then transferred from the cable provider to the ratings provider. At the ratings provider, the known identification information indicative of a sampled household is used to de-anonymize the anonymized identification information and decrypt the encrypted usage information of a record in the anonymized and encrypted report which corresponds to the sampled household.

The known identification information indicative of the sampled households may be used to de-anonymize the anonymized identification information and decrypt the encrypted usage information of all records in the anonymized and encrypted report which corresponds to the sampled households. The de-anonymized identification information and the decrypted usage information of the records corresponding to the sampled households may then be used by the ratings provider to determine program ratings.

The method may further include disallowing the ratings provider from advising the cable provider as to the identification information known by the ratings provider in order to prevent the cable provider from determining which households are sampled households and which households are non-sampled households.

In the method, the step of anonymizing and encrypting the report may be such that each record in the anonymized and encrypted report corresponding to a sampled household is able to be de-anonymized and decrypted by the ratings provider as the ratings provider knows the identification information contained in the records corresponding to the sampled households. In this case, the step of anonymizing and encrypting the report may be such that each record in the anonymized and encrypted report corresponding to a non-sampled household is unable to be de-anonymized and decrypted by the ratings provider as the identification information contained in the records corresponding to the non-sampled households is unknown to the ratings provider.

The logged information for each program streamed to a household may further include timing information (e.g., a time stamp) indicative of the time at which the household received the program. In this case, the step of anonymizing and encrypting each record in the report to anonymize and encrypt the report includes leaving the timing information contained in the record alone. Further, in this case, after de-anonymizing the anonymized identification information and prior to decrypting the encrypted usage information of a record in the anonymized and encrypted report which corresponds to a sampled household, the method includes filtering out the record corresponding to the sampled household if the time at which the sampled household received a program as indicated by the timing information contained in the record falls outside of an eligible time period associated with the sampled household.

Each household preferably includes a cable television network device such as a set-top-box (STB) to enable the cable provider to stream programs to the household. The identification information for each household includes an address for the STB in the household. In this case, the step of anonymizing and encrypting the report further includes using the STB addresses associated with the households such that the usage information contained in each record in the report is encrypted using the STB address associated with the record. The step of de-anonymizing and decrypting a record in the anonymized and encrypted report which corresponds to a sampled household includes using the known STB address of the sampled household to de-anonymize the anonymized identification information and decrypt the encrypted usage information of the record corresponding to the sampled household.

The step of encrypting the usage information contained in each record may be performed such that the STB address included in the identification information contained in the record is a decryption key for the record, or that the decryption key is derived from the STB address in part or in whole.

The step of anonymizing and encrypting the report may further include using a report key associated with the report such that the identification information and the usage information contained in each record in the report are respectively anonymized and encrypted using the report key associated with the report. In this case, the step of de-anonymizing and decrypting a record in the anonymized and encrypted report which corresponds to a sampled household includes using the known STB address of the sampled household and the report key associated with the report in order to de-anonymize the anonymized identification information and decrypt the encrypted usage information of the record corresponding to the sampled household.

Each household may be associated with an account number. An account number is a specific example of well-known information correlated to the identification information available to both the cable provider and the ratings provider. Such well-known information can be omitted from the records, yet used in their decryption. As such, the term "account number" as used herein includes other information correlated to the identification information available to both the cable provider and the ratings provider.

The identification information for each household includes the account number associated with the household. In this case, the step of anonymizing and encrypting the report further includes using the account numbers associated with the households such that the usage information contained in each record in the report is encrypted using the account number associated with the record. In accordance with a safer encryption approach of the present invention, the step of encrypting includes deriving an encryption key from a report key (which may vary per report), the STB address (contained in the report), and the correlated account number (not the in the report). The step of de-anonymizing and decrypting a record in the anonymized and encrypted report which corresponds to a sampled household includes using the account number associated with the record corresponding to the sampled household to decrypt the usage information of the record corresponding to the sampled household. In accordance with the safer encryption approach of the present invention, the step of decrypting includes deriving a decryption key from the report key, the STB address, and the account number.

The usage information for each program streamed to a household may include Video-On-Demand (VOD) viewing statistic information indicative of the use by the household of the program. The usage information for each program streamed to a household may also include provider identification (PID) information indicative of the provider of the program and asset identification (AID) information indicative of the identity of the program.

DETAILED DESCRIPTION

Figure 1:
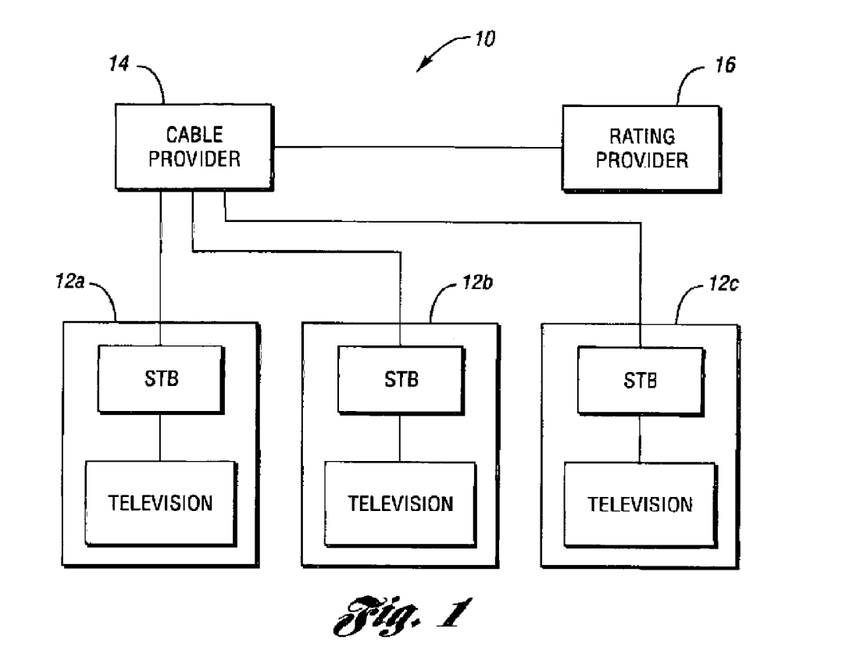
FIG. 1 illustrates a block diagram of a system for transferring information associated with households from a cable television service provider to a television program ratings provider in accordance with the present invention.

Referring now to FIG. 1, a block diagram of a system 10 for transferring information associated with cable television subscriber households 12a, 12b, 12n from a cable television service provider 14 to a television program ratings provider 16 in accordance with the present invention is shown. Households 12 are located in a given viewing area serviced by cable provider 14 and are subscribers of the cable provider. Households 12 generally include at least one television having an associated set-top-box (STB). The STBs connect the associated televisions with cable provider 14 to enable the cable provider to provide households 12 with programs for viewing by the household members on the televisions.

The STBs provide programs received from cable provider 14 to the associated televisions in households 12 for the household members to view. The programs include Video-On-Demand (VOD) programs. Typically, a household member selects a channel using the STB for the associated television to receive VOD programs associated with the selected channel from cable provider 14. While viewing a VOD program on a television, a household member may provide VOD commands to the STB in order to control the VOD program. Such VOD commands include play, pause, fast forward (FF), rewind, and the like. Cable provider 14 controls the VOD programs displayed on a television in response to the STB associated with the television receiving VOD commands from household members.

Cable provider 14 provides a VOD program to the STB of a household 12 as part of a data stream. Cable provider 14 logs information regarding VOD program streams provided to households 12. For each VOD program stream provided to a STB in a household 12, the logged information includes the following fields of information: (i) STB identification, (ii) the time (e.g., date) at which the VOD program is provided to the STB, (iii) VOD program identification, and (iv) VOD program usage information. This information associated with a VOD program stream (i.e., the STB identification, the date, the VOD program identification, and the VOD program usage information) is termed as "the VOD program stream information" herein.

Cable provider 14 periodically generates reports having logged VOD program stream information for households 12 in a viewing area. Each report includes individual records of the VOD program stream information logged for VOD programs provided to STBs within a given time period. That is, each record in the report includes the VOD program stream information logged for a VOD program provided from cable provider 14 to a given STB at a given time.

The STB identification can be the media access control (MAC) address of the STB receiving a VOD program. The STB MAC address may be used to identify the household in which the STB is located. Demographic information associated with the household may be obtained using the household location information (such as ZIP code). The STB and/or the household are typically associated with an account number which may be able to be obtained based on the STB identification.

The date at which the VOD program is provided to the STB is generally indicative of the date at which household members view the VOD program. The VOD program identification information includes provider information which identifies the provider of the VOD program, and includes asset information which identifies the identity (e.g., title) of the VOD program.

The VOD program usage information is indicative of VOD aggregate viewing statistics of a VOD program in a stream. VOD aggregate viewing statistics include total minutes of play, fast forwarding, and rewinding of a VOD program in a stream as the VOD program is controlled in accordance with VOD commands.

Ratings provider 16 desires to correlate the viewing statistics with asset metadata in order to determine program ratings for VOD programs. To this end, ratings provider 16 has agreements with certain households 12 in the viewing area to access the VOD program stream information for these households. Such households are termed as "sampled households" herein as these households provide a sampling of all households in the viewing area. The remaining households in the viewing area are termed as "non-sampled households" herein. Typically, ratings provider 16 has agreements to access the VOD program stream information for sampled households during certain eligibility time periods. Thus, a household may be a sampled household for a given time (such as a given weekday) and then be a non-sampled household for all other times (such as the other days in the week).

It is noted that ratings provider 16 may be an entity independent of cable provider 14. For example, ratings provider 16 may be a television ratings program provider such as Nielsen Media Research. Alternatively, ratings provider 16 may be a distinct division of cable provider 14. For example, cable provider 14 may include a division responsible for delivering programs via its cable infrastructure network to the subscriber households, and include a separate independent division for determining television program ratings. Herein, "cable provider" refers to an entity responsible for delivering programs via a cable infrastructure network to subscriber households and "ratings provider" refers to an entity responsible for analyzing sampled household information to determine program ratings.

As indicated above, cable provider 14 logs the VOD program stream information for all households 12 in the viewing area. As such, ratings provider 16 has to obtain the VOD program stream information for the sampled households from the cable provider in order to access such information. Ratings provider 16 knows the identities of the sampled households as the ratings provider has agreements with these households to have access to the VOD program stream information associated with these households. These agreements typically require that ratings provider 16 not reveal the identities of the sampled households to anyone else including cable provider 14. Likewise, cable provider 14 does not wish to reveal the identities of the non-sampled households to anyone else including ratings provider 16. Further, cable provider 14 generally desires that ratings provider 16 does not have access to the viewing statistics for the non-sampled households.

Thus, cable provider 14 has to provide ratings provider 16 with the reports having the VOD program stream information for all households 12 in a viewing area in a manner which (i) allows the ratings provider to access the VOD program stream information for the sampled households and (ii) prevents the ratings provider from accessing the VOD program stream information for the non-sampled households. Cable provider 14 has to provide ratings provider 16 with the VOD program stream information for all households 12 (sampled and non-sampled) as the cable provider does not know the which households are sampled households. That is, cable provider 14 cannot pre-filter the reports to provide ratings provider 16 with the VOD program stream information for just the sampled households.

As indicated above, neither cable provider 14 nor ratings provider 16 may reveal the identities of their viewers, e.g., to each other. The eligibility period in which a household is a sampled household is defined by start and end times. Ratings provider 16 identifies sampled households from the STB MAC addresses and also perhaps from the account numbers. In order for cable provider 14 to provide ratings provider 16 with reports having the VOD program stream information for all households 12, the cable provider and the ratings provider have to agree on the correlation of anonymized versions of the reports. As indicated above, cable provider 14 cannot pre-filter such reports to remove the VOD program stream information for the non-sampled households as ratings provider 16 cannot advise the cable provider of the identities of the sampled households. As such, cable provider 14 has to provide the VOD program stream information for all households at all times to ratings provider 16.

To this end, anonymization and encryption techniques are used on the VOD program stream information reports in accordance with the present invention in order to enable cable provider 14 to transfer the reports to ratings provider 16 such that the ratings provider (i) has access to the VOD program stream information for the sampled households and (ii) lacks access to the VOD program stream information for the non-sampled households.

General anonymization and encryption techniques carried out in accordance with the present invention in order to provide privacy and security will now be described. A basic understanding of encryption (with cryptographic terms in parentheses) is that an encryption algorithm (cipher) operates on (encrypts) the original data (plaintext) to produce encrypted data (ciphertext), and a corresponding decryption algorithm operates on (decrypts) the encrypted data to recover the original data. Keys provide added security by allowing the same cipher to provide different ciphertexts when using different keys. Ciphertext analysis techniques then apply only to the particular combination of plaintext, cipher, and key. This helps protect the internal workings of the cipher from applications of code-breaking techniques. If a particular ciphertext is decrypted, a well-designed cipher requires only a key change to regain its integrity.

The way keys are used divides ciphers into two categories, and the resultant differences often guide the choice of a cipher for a particular application. An important difference between them is as follows. Symmetric ciphers use a single key (also called the shared secret) for both encryption and decryption, and key modifications during encryption are therefore easily mirrored in the decryption key. Public-key encryption uses a key pair with public and private keys, and this makes mirroring key modifications during encryption difficult or impossible during decryption. Public-key encryption requires more computational resources than a symmetric cipher for a given degree of security. A given key length (e.g., 128 bits) provides a higher degree of security for a symmetric cipher than for public-key encryption.

Thus, encryption includes knowledge of an encryption algorithm (cipher) and a decryption key. Encryption allows decryption of any messages encrypted with the corresponding decryption key.

A basic understanding of anonymization is that an original value is irreversibly transformed into a distinguishable but unrecognizable value. The technical details underlying the "distinguishable" and "unrecognizable" terms can be complicated. If the resultant value need not be distinguishable, then the data value may as well be omitted entirely. Recovery of the original value is effected by comparing the anonymized data to that generated by anonymizing known values; when a match is found, the original value is recovered. Thus, recovery is only feasible when the number of known values to be anonymized and compared is relatively small when compared to the number of possible inputs. Some types of values (such as time stamps) cannot be efficiently anonymized and these values cannot be anonymized when they have be distinguishable to the receiving party.

Thus, with anonymization there is no decryption key. Anonymization includes knowledge of an anonymization algorithm (one-way hashing function). Anonymization only allows de-anonymization by comparing candidate value results. As a result, if there are sufficient candidate values, then this problem is not feasible.

An anonymization example in accordance with the present invention is as follows. In this example, numbers are original values and expected values are from one to ten; words are anonymized values; and the number n becomes the nth word in a sentence. The anonymization properties include the anonymization being one-way such that given a word, the number cannot be determined without the function (sentence). In this anonymization example, a hash can be used to anonymize any natural number. However, only ten output values limits the usefulness of the hash.

In a first anonymization example variant, the sentence making up the function is "The quick brown fox jumped over the lazy dog again." The input values of one and seven collide on the word "the" in the sentence. Collision for known inputs means that another sentence should be chosen for the function. In a second anonymization example variant, the sentence making up the function is "The quick brown fox jumped over my lazy dog again." There are no collisions for expected input values in this sentence. It can be seen that knowing a word (output) without the function (sentence) does not give the input (number).

In sum, an anonymization function is chosen that is one-way such that knowledge of the result does not reveal the original value. If the anonymization function is known, candidate values must be anonymized and compared to reveal the original values. This is suitable only when the number of candidate values makes this practical. Anonymization is not for use when there are too many values such that doing a table look-up to determine corresponding values is not feasible. As such, anonymization is not for use with dates/times (e.g., time stamps) having varying values. For practical purposes, the anonymization function is a hash function. Otherwise, different types of inputs require different functions. As such, variable inputs are mapped to a fixed number of output values and multiple inputs that map to the same output value are "collisions". Hash functions should be chosen to minimize the chance of collisions. Consequently, a sufficient number of possible inputs greater than the expected inputs is required. This assumes that there are many fewer expected inputs than the possible range of inputs.

As indicated above, the VOD program stream information generated for each VOD program provided in a stream to a STB in a household 12 includes the following fields of information: (i) STB identification, (ii) the date at which the VOD program is provided to the STB, (iii) VOD program identification, and (iv) VOD program usage information. Cable provider 14 generates reports of the VOD program stream information for all households. Each record in a report includes the VOD program stream information logged for a VOD program provided from cable provider 14 to a STB at a given time. Each record in a report is divided into the fields.

In order for cable provider 14 to provide the VOD program stream information for the sampled households to ratings provider 16 without knowing the sampled household identities, the VOD program stream information reports for all households are anonymized and encrypted in accordance with the present invention as follows. The STB identification information (i.e., viewer and household identity information including STB MAC address and, if used, any account numbers) is anonymized. The date information (i.e., the VOD program transaction time stamp) is not anonymized. Otherwise, it would be impractical to control access of ratings provider 16 to sampled households by eligibility time period.

The date information (i.e., the VOD program transaction time stamp) may be encrypted in order to determine record eligibility separate from the other record information. This would require a different encryption key to ensure privacy.

All other information including the VOD program identification and the VOD program usage information is encrypted. As such, each viewing record is encrypted and the encryption key varies by household. The encrypted VOD program identification includes the provider and asset identifiers, and the encrypted VOD program usage information includes aggregate viewing statistics (e.g., total minutes of play, fast forward, rewind). A further improvement is to encrypt those fields billed separately in different groups. This requires a different encryption key for each field group to ensure privacy. In general, key identifiers (such as STB MAC address) are anonymized, but not encrypted; non-information fields to control access filtering may be neither anonymized nor encrypted; and other fields may be partitioned into one or more field groups to be encrypted with their own encryption keys. All transferred records are further encrypted between cable provider 14 and ratings provider 16. This includes report and associated data and asset metadata.

Figure 2:
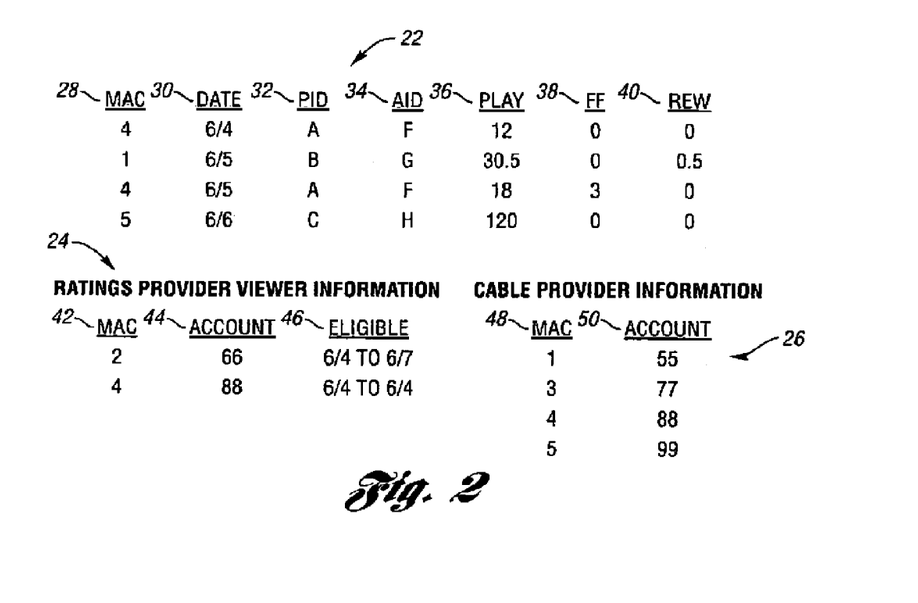
FIG. 2 illustrates a VOD program stream information report for households in a viewing area during a given time period, a ratings provider information table, and a cable provider information table in accordance with the present invention.

With reference to FIG. 2, a walkthrough example of anonymization and encryption performed on a VOD program stream information report in accordance with the present invention will now be described. In this example, the example data fields in the report are as follows: STB MAC address—one digit; account number—two digits; transaction time stamp—day to day; provider and asset ID—one letter; aggregate viewing statistics—totals in minutes. The anonymization function is such that the number n means the nth word in the sentence "The quick brown fox jumped over my lazy dog again." A symmetric cipher is used for encryption such that the encryption key is the decryption key.

FIG. 2 includes a VOD program stream information report 22, a ratings provider information table 24, and a cable provider information table 26. Report 22 includes the logged VOD program stream information associated with all households (sampled and non-sampled) in viewing area during a given time period. As described above, this information is logged as VOD programs are streamed to the households. The VOD program stream information for each stream is logged in its own row within report 22. As such, each row in report 22 represents a record of VOD program stream information.

Report 22 represents a format in which VOD program stream information is logged and includes a MAC address (MAC) column 28, a transaction time stamp (Date) column 30, a provider identification (PID) column 32, an asset identification (AID) column 34, a total minutes of play (Play) column 36, a total minutes of fast forward (FF) column 38, and a total minutes of rewind (Rew) column 40. As shown in FIG. 2, the VOD program stream information for four streams (using the example data fields introduced above) are listed (row-by-row) under the appropriate columns of report 22. For example, the first record listed in the first row of report 22 lists the MAC address as "4", the date as "6/4", the PID as "A", the AID as "F", the total minutes of Play as "12", the total minutes of FF as "0", and the total minutes of Rew as "0".

Ratings provider information table 24 includes identification information of the sampled households known by ratings provider 16. Ratings provider 16 uses this information to identify the sampled households. This information accessible to ratings provider 16 includes the MAC addresses of STBs in sampled households, account numbers associated with the sampled households, and the eligibility period in which the ratings provider is entitled to access the VOD program stream information of the sampled households. The eligibility period is indicative of when a household qualifies as a sampled household as opposed to being a non-sampled household. Accordingly, table 24 includes a MAC address (MAC) column 42, an account (Account) column 44, and an eligibility period (Eligible) column 46. As understood from table 24, the sampled households are those households having STBs with the MAC address values of "2" and "4".

Cable provider information table 26 includes identification information of all households in the viewing area. Cable provider 14 uses this information to identify households which are subscribers of the cable provider. This information accessible to cable provider 14 includes the MAC address of STBs in households and the account numbers associated with the households. Accordingly, table 26 includes a MAC address (MAC) column 48 and an account (Account) column 50.

As mentioned above, ratings provider 16 cannot tell cable provider 14 which households are sampled households and the cable provider does not have access to ratings provider information table 24. Consequently, ratings provider 16 has to acquire an anonymized and encrypted version of report 22 (which includes information for sampled and non-sampled households) in order to obtain the information for the sampled households.

Figure 3:
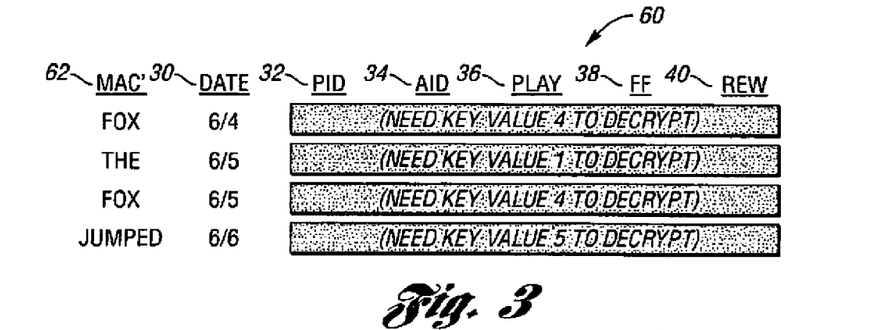
FIG. 3 illustrates the VOD program stream information report shown in FIG. 2 anonymized and encrypted in accordance with a simple anonymization and encryption approach of the present invention.

Referring now to FIG. 3, with continual reference to FIG. 2, an anonymized and encrypted version 60 of report 22 in accordance with the present invention is shown. Cable provider 14 generates anonymized and encrypted report 60 by anonymizing the MAC address, leaving the Date alone, and encrypting the rest of the VOD program stream information. The rest of the VOD program stream information includes the VOD program identification (PID and AID) and the VOD program usage information (Play, FF, Rew).

Thus, anonymized and encrypted report 60 includes a MAC' column 62 which lists the anonymized MAC addresses. For example, the MAC address value of "4" of the first and third records in report 22 corresponds to the anonymized MAC address value of "fox" of the first and third records in report 60; and the MAC address values of "1" and "5" of the second and fourth records in report 22 respectively correspond to the anonymized MAC address values of "the" and "jumped" of the second and fourth records in report 60.

The original MAC addresses are used as the per-record decryption key. Thus, the key value "4" is required to decrypt the encrypted VOD program stream information for the first and third records in report 60; the key value "1" is required to decrypt the encrypted VOD program stream information for the second record in report 60; and the key value "5" is required to decrypt the encrypted VOD program stream information for the fourth record in report 60.

Ratings provider 16 receives anonymized and encrypted report 60 from cable provider 14. Ratings provider 16 knows the anonymization function "The quick brown fox jumped over my lazy dog again" and computes the MAC' for the sampled households (i.e., those households having STB MAC address values of "2" and "4"). For example, ratings provider 16 computes the anonmymized MAC address value of "quick" as the MAC' value of 2'; and computes the anonymized MAC address value of "fox" as the MAC' value of 4'.

Figure 4:
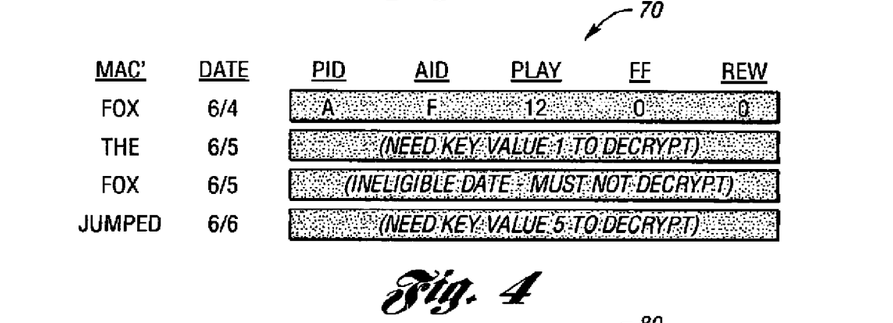
FIG. 4 illustrates the VOD program stream information report shown in FIG. 3 de-anonymized and decrypted in accordance with the simple anonymization and encryption approach of the present invention.

Referring now to FIG. 4, with continual reference to FIGS. 2 and 3, a de-anonymized and decrypted version 70 of report 60 in accordance with the present invention is shown. Ratings provider 16 de-anonymizes and decrypts report 60 to generate the de-anonymized and decrypted report 70 by determining that the MAC address value for "fox" is "4". As such, ratings provider 16 can decrypt records with an anonymized MAC (MAC') fox. Consequently, ratings provider 16 is able to decrypt the encrypted VOD program stream information of the first record in report 60 as shown in FIG. 4. Ratings provider 16 is unable to decrypt the encrypted VOD program stream information for the second and fourth records in report 60 as these records need respective key values "1" and "5" for decryption. As indicated above, ratings provider 16 only knows the key values "2" and "4".

However, ratings provider 16 is able to decrypt the encrypted VOD program stream information for the third record as the ratings provider knows the required key value "4". The date associated with the third record is "6/5". Referring to ratings provider information table 24 in FIG. 2, ratings provider 16 is only entitled to access the VOD program stream information for MAC address "4" on the date "6/4". As such, the third record has an ineligible date and ratings provider 16 is not authorized to decrypt the information associated with this record even though it is able to do so. To this end, ratings provider 16 should filter out records that have ineligible dates (such as the third record) prior to decryption steps being carried out.

Ratings provider 16 cannot decrypt records with a MAC' other than "quick" or "fox" without trying all possible decryption values. The problem with this simple anonymization and encryption approach described with reference to FIGS. 3 and 4 is that there are only as many keys as MAC addresses.

This simple anonymization and encryption approach has certain weaknesses which may be addressed as follows. A first weakness is that de-anonymizing compromises encrypted information because the de-anonymized value (MAC address) is the decryption key. A solution is to include external information when forming the decryption key. This protects the decryption key against brute force or dictionary attack.

There are several possibilities for the external information. The external information may include a global shared secret (such as a report key) between cable provider 14 and ratings provider 16. This does not protect the decryption key from ratings provider 16, but does protect the decryption key from third parties. The external information may include information correlated to de-anonymized values not in the report data. This adds protection from ratings provider 16 as well for unknown values. For example, the external information included may be account numbers which are folded into the encryption key to strengthen encryption.

A second weakness with the simple anonymization and encryption approach is that MAC addresses are not diverse. De-anonymizing MAC addresses by brute force is thus feasible. A solution is to add related information (such as account numbers) known to cable provider 14 and ratings provider 16.

In the described simple anonymization and encryption example, there are only ten possible MAC addresses. However, there are one hundred possible account numbers and MAC addresses are correlated with the account numbers. If the combination of MAC address and account number is anonymized, then there are now 1 possible key values to try when using the brute force attack. The brute force attack method is now one hundred times harder. If the account number is nine digits (as opposed to two digits), then the brute force attack becomes a billion times harder. The advantage to this solution is that an eligible MAC address and its account number are still easily recoverable.

A third weakness with the simple anonymization and encryption approach is that anonymization and encryption is the same across reports. Consequently, cracking a past report assists in cracking a new report. A solution is to combine data with a value that changes per report.

In sum, the three weaknesses and solutions of the simple anonymization and encryption approach are as follows. First, de-anonymizing compromises encrypted information because the de-anonymized value (MAC address) is the decryption key. The solution to this first weakness is to include external information when forming the decryption key. Second, MAC addresses are not diverse and, consequently, de-anonymizing MAC addresses by brute force or dictionary attack is feasible. The solution to this second weakness is to add related information known to both cable provider 14 and ratings provider 16 (e.g., account numbers). Third, anonymization and encryption is the same across reports. As a result, cracking a past report assists in cracking a new report. The solution to this third weakness is to combine data with a value that changes per report.

The three solutions are used in accordance with the present invention to provide a safer anonymization and encryption approach which addresses the noted weaknesses of the simple anonymization and encryption approach. The safer approach includes using a report key (i.e., external information that changes per report) to vary the anonymization and encryption per report. The report key does not appear within the report in order to protect against de-anonymization from third parties. The safer approach also includes using account numbers in the per-record encryption. As a result, de-anonymizing no longer compromises per-record encryption unless the corresponding account number is known. This provides for protection against attack on per-record encryption by a receiver.

Figure 5:
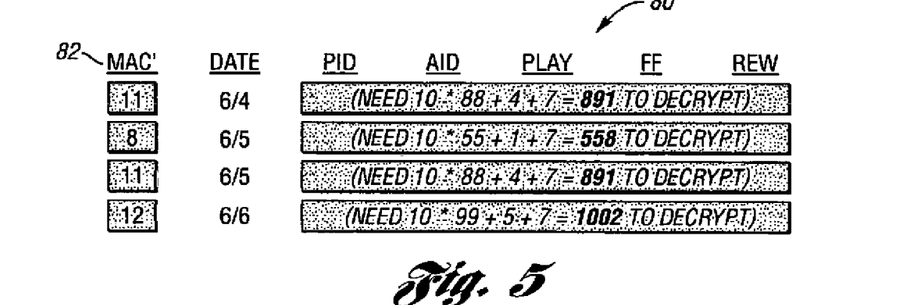
FIG. 5 illustrates the VOD program stream information report shown in FIG. 2 anonymized and encrypted in accordance with a safer anonymization and encryption approach of the present invention.
Figure 6:
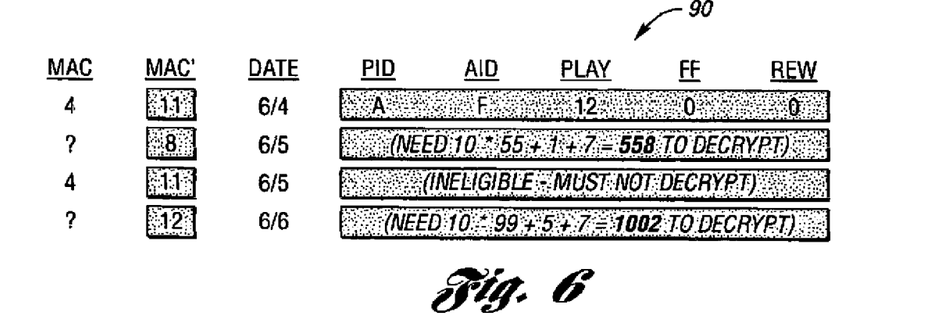
FIG. 6 illustrates the VOD program stream information report shown in FIG. 2 de-anonymized and decrypted in accordance with the safer anonymization and encryption approach of the present invention.

With reference to FIGS. 5 and 6, a walkthrough example of the safer anonymization and encryption approach performed on a VOD program stream information report (such as report 22 shown in FIG. 2) will now be described. In this example, the anonymization function is such that anonymization is varied using a report key. As such, the number n.fwdarw.word (n+(report key)). Encryption is carried out using a symmetric cipher (i.e., the encryption key is the decryption key). In this example, the report key is a single digit having a value from zero to nine. The encryption key is not just the MAC address, but includes the account number and the report key. For example, the encryption key identifier value is (10*account number)+(MAC address)+(report key).

As an example, using a report key of seven, cable provider 14 anonymizes and encrypts report 22 to generate a safer anonymized and encrypted report 80 shown in FIG. 5. Cable provider 14 generates report 80 by anonymizing the MAC address using the report key, leaving the Date alone, and encrypting the rest of the VOD program stream information (i.e., the VOD program identification (PID and AID) and the VOD program usage information (Play, FF, Rew)). Cable provider 14 encrypts the rest of the VOD program stream information using an encryption key which includes a key identifier value based on the account number, the MAC address, and the report key.

Thus, report 80 includes a MAC' column 82 which lists the anonymized MAC addresses. For example, the MAC address of "4" of the first and third records in report 22 corresponds to the anonymized MAC address of "11" in the first and third records of report 80. This is in accordance with the anonymization function: MAC address+report key="4"+"7"=anonymized MAC address of "11". The MAC address of "1" of the second record in report 22 corresponds to the anonymized MAC address of "8" in the second record of report 80 as "1"+"7"="8". Likewise, the MAC address of "5" of the fourth record in report 22 corresponds to the anonymized MAC address of "12" in the fourth record of report 80 as "5"+"7"="12".

Unlike simple anonymized and encrypted report 60 shown in FIG. 3, the original MAC addresses are not used as the per-record decryption key. Instead, each record of report 80 is encrypted using an encryption key which has a key identifier value based on the account number, the MAC address, and the report key. For example, the VOD program stream information of the first record of report 22 is encrypted using the encryption key "891" as this encryption key is (10*account number)+(MAC address)+(report key)=(10*88)+(4)+(7)=891. Likewise, the VOD program stream information of the second record of report 22 is encrypted using the encryption key of "558" (where 10*account number)+(MAC address)+(report key)=10*55+1+7=558. In this manner, the VOD program stream information of the third and fourth records in report 22 is encrypted using the respective encryption keys of "891" and "1002".

Thus, ratings provider 16 has to use the decryption keys "891", "558", "891", and "1002" in order to respectively decrypt the encrypted VOD program stream information of the first, second, third, and fourth records of the safer anonymized and encrypted report 80. Ratings provider 16 receives report 80 from cable provider 14. Ratings provider 16 knows the MAC addresses, the account numbers, and the eligibility periods of the sampled households as set forth in table 24 of FIG. 2. Ratings provider 16 also knows the report key (seven in this example), the anonymization function ("the quick brown fox jumped over my lazy dog again" where the number n word (n+(report key)), and the decryption key generation sequence ((10*account number)+(MAC address)+(report key)). However, ratings provider 16 does not know the account numbers for ineligible MAC addresses (i.e., the non-sampled households which have STB MAC addresses other than "2" and "4").

Ratings provider 16 can de-anonymize MAC' address values of "9" and "11" (which respectively correspond to MAC addresses "2" and "4") and decrypt values of "689" and "891". Accordingly, ratings provider 16 is able to de-anonymize and decrypt report 80 to generate a de-anonymized and decrypted report 90 as shown in FIG. 6. Ratings provider 16 generates report 90 by de-anonymizing the MAC' address value of "11" to generate the corresponding MAC address value of "4" for the first record of report 90. Consequently, ratings provider 16 is able to decrypt the encrypted VOD program stream information of the first record of report 90 as shown in FIG. 6 by using the decryption key "891". Ratings provider 16 is unable to decrypt the encrypted VOD program stream information for the second and fourth records in report 90 as these records respectively require the decryption keys "558" and "1002" for decryption. As indicated above, ratings provider 16 is only able to determine the decryption values "689" and "891".

Again, ratings provider 16 is able to decrypt the encrypted VOD program stream information for the third record as the ratings provider knows the required decryption key of "891". However, as the date associated with the third record is "6/5" the third record has an ineligible date and ratings provider 16 is not authorized to decrypt the information associated with this record.

As such, no one can decrypt the encrypted information without using all possible decryption key values. For the non-sampled households, ratings provider 16 does not have the associated account numbers and, thus, the ratings provider does not have the decryption keys for the non-sampled households. Accordingly, ratings provider 16 cannot decrypt the encrypted information associated with the non-sampled households without using all possible decryption key values.

The required knowledge of the safer anonymization and encryption approach described with reference to FIGS. 5 and 6 is as follows. The required knowledge per report (which is not included within the report) includes the anonymization function, the encryption algorithm (cipher) and key generation function, the field list for anonymization (e.g., key identifier=STB MAC address), the field list for encryption (all not needed for access control filtering), and the report key (best security if unique for each report). The required knowledge per record in a report includes the key identifier (e.g., the STB MAC address) and the associated identifier such as an account number (not included within the report).

In accordance with the present invention, the safer anonymized and encrypted report such as report 80 shown in FIG. 5 is super-encrypted solely for ratings provider 16. PGP encryption may be used with a public key exchange requirement. Cable provider 14 and ratings provider 16 agree on the report key per report and the report key is to be exchanged as needed. The exchange of a report key from cable provider 14 to ratings provider 16 for a report can be done when the cable provider provides the report to the ratings provider. The report key can be exchanged using a secure protocol such as the Diffie-Hellman exchange protocol after the report key has been super-encrypted using PGP. MD5 is preferably used as the anonymization function such that the anonymization is the MD5 hash of the concatenation of the report key and the data to be anonymized. Blowfish is preferably used as the encryption algorithm with the key length being 128 bits to match the MD5 output length. The per-record encryption key is the anonymization of the concatenation of account number and STB MAC address. In sum, in a report generated using the safer (and simple) anonymization and encryption approach, the account numbers do not appear, the STB MAC addresses are anonymized, the transaction time stamps are left alone, and all other information fields are encrypted.

As described, anonymization and encryption is used as the technical implementation of privacy concerns for data exchange between cable provider 14 and ratings provider 16. As described above, the exchanged viewing/usage data is anonymized and encrypted in accordance with the present invention as follows.

Report Key

Cable provider 14 and ratings provider 16 coordinate and agree upon a shared secret value (i.e., the report key) for each report. The value of the report key is not communicated within the report itself. Maximum protection is obtained if this value is changed and communicated securely on a per-report basis. Such communications should use security techniques such as PGP or authorized Diffie-Hellman key exchange to protect the exchanged data.

Data Packet Anonymization

For each viewing/usage data packet, the SetTopID element is anonymized as a one-way hash of the concatenation of the true SetTopID value (e.g., the STB MAC address) and the report key. This allows recovery of the true SetTopID from the anonymized value with knowledge of the report key, for known true SetTopID values such as sampled households. The MD5 algorithm is recommended as the one-way hash function. Other alternatives include SHA-1 and related algorithms.

Data Packet Encryption

For each viewing/usage data packet, if anonymized data for non-sampled households is to be made available for analysis by ratings provider 16, then the data packet type and remaining elements is not encrypted. This allows analysis of all data in each report, but only sampled household data can be correlated across report key changes.

For each viewing/usage data packet, if anonymized data for non-sampled households is not to be made available for analysis by ratings provider 16, then the data packet type and all remaining elements within a data packet is encrypted with a symmetric cipher using a "row-level" key. This key is formed as a one-way hash of the concatenation of: i) the true SetTopID value for the data packet; ii) a value associated with the true SetTopID that does not appear in the viewing/usage data, is agreed upon by cable provider 14 and ratings provider 16, and is only known to the ratings provider for sampled households (account number is recommended as this associated value because it can be readily collected for sampled households); and iii) the report key.

The row-level key can only be reconstructed for sampled households from the anonymized and encrypted information. Encrypted non-sampled household data cannot be decrypted and is inaccessible to ratings provider 16. Again, MD5 algorithm can be used as the one-way hash function and other alternatives include SHA-1 and related algorithms. Blowfish is recommended as the symmetric cipher. Other alternatives include Rjindael. The symmetric cipher key length should be chosen to match the one-way hash function selected. A subset sample of non-sampled household data can be made available to ratings provider 16 by leaving data for that subset unencrypted. This allows analysis of unencrypted data in each report, but only sampled household data can be correlated across report key changes. It is noted that reference data remains unencrypted.

Example XML

An encrypted data packet appears as a <Private> element at the same level as the other data packets. Binary values resulting from anonymization and encryption appear as uppercase hexadecimal digits. The data packet type appears within a <Type> sub-element to be encrypted along with other elements within the data packet. Encrypted elements within the encrypted data packet appear within an <Encrypted> sub-element.

e.g., Original Data Packet:

```
< ViewingRecord >
< Timestamp > 2003-01-23T20:55:20.123Z < /Timestamp >
< STB > 010203040506 < /STB >
< Type > Stream Start < /Type >
< Session > 0123456789 < /Session >
< Stream > 9876543210 < /Stream >
< ProviderID > cablelabs-films.com.< /ProviderID >
< AssetID >ABCD1234567890123456 < /AssetID >
< /ViewingRecord >
```

After Anonymization:

```
< ViewingRecord >
< Timestamp > 2003-01-23T20:55:20.123Z < /Timestamp >
< STB > 1234567890ABCDEF1234567890ABCDEF < /STB >
< Type > Stream Start < /Type > < Session > 0123456789 < /Session >
< Stream > 9876543210 < /Stream >
< ProviderID > cablelabs-films.com.< /ProviderID >
< AssetID > ABCD1234567890123456 < /AssetID >
< /ViewingRecord >
```

After Encryption:

```
< Private >
< STB > 1234567890ABCDEF1234567890ABCDEF < /STB >
< Encrypted > 245624574852342ABF4634734235233DACBE23535
< /Encrypted >
< /Private >
```

As can be understood, the <Encrypted> value may require many hexadecimal digits to represent. In this example XML the timestamp is not being left unencrypted. For that, the <Private> element would contain a <Timestamp> element.

Data Packet Decryption

A companion decryption process (as described above) is used to undo the anonymization and encryption of applicable data packets as described above.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

The invention claimed is:

1. A method, comprising:
   generating, by a computer, a plurality of records corresponding to a plurality of households, wherein the records each contain an anonymized and unencrypted version of household identification information and encrypted program usage information for the record's corresponding household, and wherein the encrypted program usage information in each record is decryptable using a distinct decryption key that is based on the record's corresponding household's identification information.

2. The method of claim 1, wherein each record's program usage information comprises information identifying audiovisual programs that were transmitted to a corresponding household.

3. The method of claim 1, wherein each record's program usage information comprises timing information identifying a time at which the record's corresponding household received a program.

4. The method of claim 3, wherein the timing information is unencrypted, and is not anonymized.

5. The method of claim 3, further comprising using the timing information to filter the plurality of records and exclude entries that fall outside of an eligible time period.

6. The method of claim 1, wherein the program usage information identifies total amount of time a program was viewed.

7. The method of claim 1, wherein the program usage information comprises video on demand viewing statistics.

8. The method of claim 1, wherein the household identification information is an account number.

9. The method of claim 1, wherein the distinct decryption key is further based on a shared secret between a sender and recipient of the plurality of records.

10. The method of claim 9, further comprising varying the shared secret and performing the generating and a second time in which the distinct decryption keys are based on the varied shared secret.

11. The method of claim 1, wherein the distinct decryption key is further based on a report key.

12. The method of claim 1, wherein each record comprises information identifying audiovisual programs that were viewed by a corresponding household.

13. The method of claim 1, wherein the household identification information is an address of a device in the household.

14. The method of claim 1, wherein the program usage information comprises information identifying usage of fast-forward or rewind commands during viewing of a program.

15. The method of claim 1, wherein each record's program usage information comprises information identifying audiovisual programs that were viewed by a corresponding household.

16. A method, comprising:
   generating, by a computer a plurality of records corresponding to a plurality of households, wherein the records each contain an anonymized and unencrypted version of household identification information and encrypted program usage information for a corresponding household, wherein the encrypted program usage information is decryptable using a distinct decryption key that is based on the record's corresponding household's identification information; and
   using information common to both a sender and recipient of the plurality of records in a hash function to generate the anonymized and unencrypted version of the household identification information.

17. The method of claim 16, wherein the household identification information is an account number.

18. The method of claim 16, wherein the household identification information is an address of a device in the household.

19. A method, comprising:
   receiving, by a computer, a plurality of records corresponding to a plurality of households, each record containing an anonymized and unencrypted version of household identification information and encrypted program usage information for the record's corresponding household; and decrypting each record's encrypted program usage information using a distinct decryption key that is based on the record's corresponding household's identification information.

20. The method of claim 19, further comprising:

obtaining household identification information for a plurality of households who have given permission to a ratings provider to access viewing history information;

determining anonymized versions of information identifying each of the plurality of households; and using the determined anonymized versions of information identifying each of the plurality of households to select records for decryption.

21. The method of claim 19, wherein the records further comprise timing information identifying a time at which a corresponding household received a program, and the method further comprises using the timing information to select records that fall within an eligible time period for monitoring.

22. The method of claim 19, wherein the program usage information identifies an amount of time when a program was viewed.

23. The method of claim 19, wherein the program usage information comprises video on demand aggregate viewing statistics.

24. The method of claim 19, wherein the distinct decryption key is further based on a shared secret between a sender and recipient of the records.

25. The method of claim 24, further comprising performing the receiving and decrypting a second time using a different shared secret.

26. The method of claim 19, wherein the distinct decryption key is further based on a report key.

27. The method of claim 19, wherein the program usage information comprises information identifying usage of fast-forward or rewind commands during viewing of a program.

28. The method of claim 19, wherein the household identification information is an account number.

29. The method of claim 19, wherein the household identification information is an address of a device in the household.

30. A method, comprising:

analyzing, by a computer, a plurality of records corresponding to a plurality of households, wherein the records each contain an anonymized and unencrypted version of household identification information and encrypted program usage information for the record's corresponding household, and wherein the encrypted program usage information in each record is decryptable using a distinct decryption key that is based on the record's corresponding household's identification information.

31. The method of claim 30, wherein each record's program usage information comprises information identifying audiovisual programs that were transmitted to a corresponding household.

32. The method of claim 30, wherein each record's program usage information comprises timing information identifying a time at which the record's corresponding household received a program.

33. The method of claim 32, wherein the timing information is unencrypted, and is not anonymized.

34. The method of claim 32, further comprising using the timing information to filter the plurality of records and exclude entries that fall outside of an eligible time period from the analyzing.

35. The method of claim 30, wherein the program usage information identifies an amount of time a program was viewed.

36. The method of claim 30, wherein the program usage information comprises video on demand viewing statistics.

37. The method of claim 30, wherein the program usage information comprises information identifying usage of fast-forward or rewind commands during viewing of a program.

38. The method of claim 30, wherein the household identification information is an account number.

39. The method of claim 30, wherein the household identification information is an address of a device in the household.

40. The method of claim 30, wherein the distinct decryption key is further based on a shared secret between a sender and recipient of the plurality of records.

41. The method of claim 31, further comprising varying the shared secret and performing the analyzing a second time in which the distinct decryption keys are based on the varied shared secret.

42. The method of claim 30, wherein the distinct decryption key is further based on a report key.

43. A method, comprising:

analyzing, by a computer, a plurality of records corresponding to a plurality of households, wherein the records each contain an anonymized and unencrypted version of household identification information and encrypted program usage information for a corresponding household, wherein the encrypted program usage information is decryptable using a distinct decryption key that is based on the record's corresponding household's identification information; and using information common to both a sender and recipient of the plurality of records in a hash function to process the anonymized and unencrypted version of the household identification information.

44. The method of claim 43, wherein each record comprises information identifying audiovisual programs that were viewed by a corresponding household.

45. The method of claim 43, wherein each record's program usage information comprises information identifying audiovisual programs that were transmitted to a corresponding household.

46. The method of claim 43, wherein the household identification information is an account number.

47. The method of claim 43, wherein the household identification information is an address of a device in the household.

* * * * *